United States Patent
Wernett

(10) Patent No.: US 11,365,312 B2
(45) Date of Patent: *Jun. 21, 2022

(54) SURFACE TREATED INORGANIC PARTICLES AND POLYMER COMPOSITIONS FOR HIGH TEMPERATURE APPLICATIONS

(71) Applicant: Specialty Minerals (Michigan) Inc., Bingham Farms, MI (US)

(72) Inventor: Patrick Clinton Wernett, Upper Black Eddy, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/931,329

(22) Filed: May 13, 2020

(65) Prior Publication Data

US 2020/0277481 A1 Sep. 3, 2020

Related U.S. Application Data

(63) Continuation of application No. 15/708,608, filed on Sep. 19, 2017, now Pat. No. 10,683,411.

(60) Provisional application No. 62/490,939, filed on Apr. 27, 2017.

(51) Int. Cl.
| | | |
|---|---|---|
| *C08L 23/14* | (2006.01) | |
| *C08K 9/08* | (2006.01) | |
| *C08K 3/34* | (2006.01) | |
| *C08K 5/00* | (2006.01) | |

(52) U.S. Cl.
CPC .............. *C08L 23/14* (2013.01); *C08K 3/346* (2013.01); *C08K 5/005* (2013.01); *C08K 9/08* (2013.01); *C08L 2201/08* (2013.01)

(58) Field of Classification Search
CPC .. C08L 23/14; C08K 9/08; C08K 3/34; C08K 5/00
USPC ........................................................ 524/111
See application file for complete search history.

(56) References Cited

U.S. PATENT DOCUMENTS

| | | | |
|---|---|---|---|
| 6,271,286 B1 | 8/2001 | Leidner et al. | |
| 6,383,425 B1 | 5/2002 | Wu et al. | |
| 6,521,675 B1 | 2/2003 | Wu et al. | |
| 6,562,447 B2 | 5/2003 | Wu et al. | |
| 6,593,400 B1 * | 7/2003 | Drummond | C08K 9/08 523/213 |
| 6,815,471 B2 | 11/2004 | Leidner et al. | |
| 6,926,512 B2 | 8/2005 | Wu et al. | |
| 2002/0025995 A1 | 2/2002 | Leidner et al. | |
| 2002/0035164 A1 | 3/2002 | Wu et al. | |
| 2002/0105106 A1 | 8/2002 | Wu et al. | |
| 2015/0376414 A1 | 12/2015 | Jouffret et al. | |

FOREIGN PATENT DOCUMENTS

| | | |
|---|---|---|
| JP | H02 135242 A | 5/1990 |
| JP | 2002-519469 A | 7/2002 |
| JP | 2002-524598 A | 8/2002 |
| WO | WO 0000557 A1 | 1/2000 |
| WO | WO 0014150 A1 | 3/2000 |

OTHER PUBLICATIONS

International Search Report and the Written Opinion of PCT/US2018/027816 dated Jun. 25, 2018, 9 pages.
Harutun G. Karian, Handbook of Polypropylene and Polypropylene Composites, Published n Taylor & Francis e-Library, 2009, pp. 273-274.
Technical Data, FlexTalc® Series Talc Products, Specialty Minerals Inc. Apr. 2008; 1 page.
Technical Data, MICROTUFF® AGD densified appearance grade talcs, Specialty Minerals Inc. rev. Jun. 2004; 1 page.
Technical Data, TALCRON® Montana talc, Specialty Minerals Inc. 2007; 1 page.
Technical Data, ULTRATALC® 609 high purity Montana talc, Specialty Minerals Inc. 2003; 1 page.

* cited by examiner

*Primary Examiner* — Deve V Hall
(74) *Attorney, Agent, or Firm* — Squire Patton Boggs (US) LLP

(57) ABSTRACT

The present invention relates to a composition for high temperature applications. More specifically, the present invention relates to a coated talc, a process for the preparation of such and its use as an additive in the production of polyolefin composite. Polyolefin composites produced according to the process of the present invention are exhibit a high thermal stability and are useful in a broad range of high temperature applications.

6 Claims, 3 Drawing Sheets

SURFACE TREATED INORGANIC PARTICLES AND POLYMER COMPOSITIONS FOR HIGH TEMPERATURE APPLICATIONS

This application is a continuation of U.S. patent application Ser. No. 15/708,608, filed Sep. 19, 2017, which claims the benefit of U.S. Patent Application No. 62/490,939 filed Apr. 27, 2017, both of which are incorporated by reference herein in their entirety.

BACKGROUND OF THE INVENTION

Field of the Invention

The present invention relates to a composition and product that exhibits heat stability in high temperature applications. More specifically, the present invention relates to a composition of a polymer, a surface treated or coated talc, and thermal stabilizers.

The composition of the present invention is useful for parts in a broad range of high temperature applications.

Description of the State of the Art

Certain polymers such as polyolefins are particularly useful for high temperature applications due to their high thermal stability when used with thermal stabilizers. Parts in such applications, for example, under the hood of a car, are subjected to high temperatures well above ambient temperature for minutes or hours at a time. Polyolefins can be subjected to such use for many hours before the onset of thermal instability, for example, as shown by embrittlement. However, polyolefins on their own may have insufficient stiffness for certain applications. Additionally, the cyclical nature of the heat exposure results in expansion and contraction of the part which leads to dimensional instability, i.e., the shape of the part is altered during use.

What is needed is a polyolefin composition that has high thermal stability while also having high dimensional stability and a high stiffness for a broad range of high temperature applications.

SUMMARY OF THE INVENTION

Embodiments of the present invention include a composition comprising; a polyolefin; particles of inorganic mineral having a surface treatment including a coating of a surface treatment component, and thermal stabilizers, wherein the inorganic mineral is selected from the group consisting of talc, calcium carbonate, precipitated calcium carbonate, clay, and silica, wherein the surface treatment component is selected from the group consisting of a functionalized polyether, and a carbon based polymer, wherein the surface treatment component inhibits adsorption of the thermal stabilizers on the particles which allows the thermal stabilizers to remain distributed in the polyolefin and reduce degradation of the composition due to exposure to a high temperature environment.

The above embodiments may include any one or combination of the following features: wherein the inorganic mineral is talc; wherein the surface treatment component is polysorbate 20 (PO-20); wherein a ratio of PO-20 to talc is 0.1 to 5 weight %; wherein a ratio of PO-20 to talc is 0.4 to 0.8 weight %; wherein the thermal stabilizers are uniformly distributed throughout the polyolefin; and wherein the surface treatment component blocks sites on the particles that can adsorb the thermal stabilizers in the polyolefin which would decrease a resistance of the polyolefin to deterioration of its properties resulting from exposure to a high temperature environment; and wherein the surface treatment component enhances the compatibility of the polyolefin and the particles.

Embodiments of the present invention include a method of forming a composition, comprising: forming a surface treatment coating over surfaces of particles of inorganic mineral, wherein the inorganic mineral is selected from the group consisting of talc, calcium carbonate, precipitated calcium carbonate, clay, and silica, wherein the surface treatment coating is selected from the group consisting of a functionalized polyether, and a carbon based polymer; melt compounding the coated particles with a polyolefin comprising thermal stabilizers to form a composition comprising the coated particles dispersed throughout a polyolefin matrix, wherein the surface treatment coating inhibits adsorption of the thermal stabilizers on the particles during the compounding so that the thermal stabilizers are dispersed throughout the polyolefin matrix.

The above embodiments include any one or any combination of the following features: wherein the inorganic mineral is talc; wherein the surface treatment coating is polysorbate 20 (PO-20); wherein a ratio of PO-20 to talc is 0.1 to 5 weight %; wherein a ratio of PO-20 to talc is 0.4 to 0.8 weight %; wherein the thermal stabilizers are uniformly distributed throughout the polyolefin matrix; and wherein the surface treatment component blocks sites on the particles that can adsorb the thermal stabilizers in the polyolefin matrix which would decrease a resistance of the polyolefin to deterioration of its properties resulting from exposure to a high temperature environment.

DETAILED DESCRIPTION OF THE INVENTION

Figure 1:
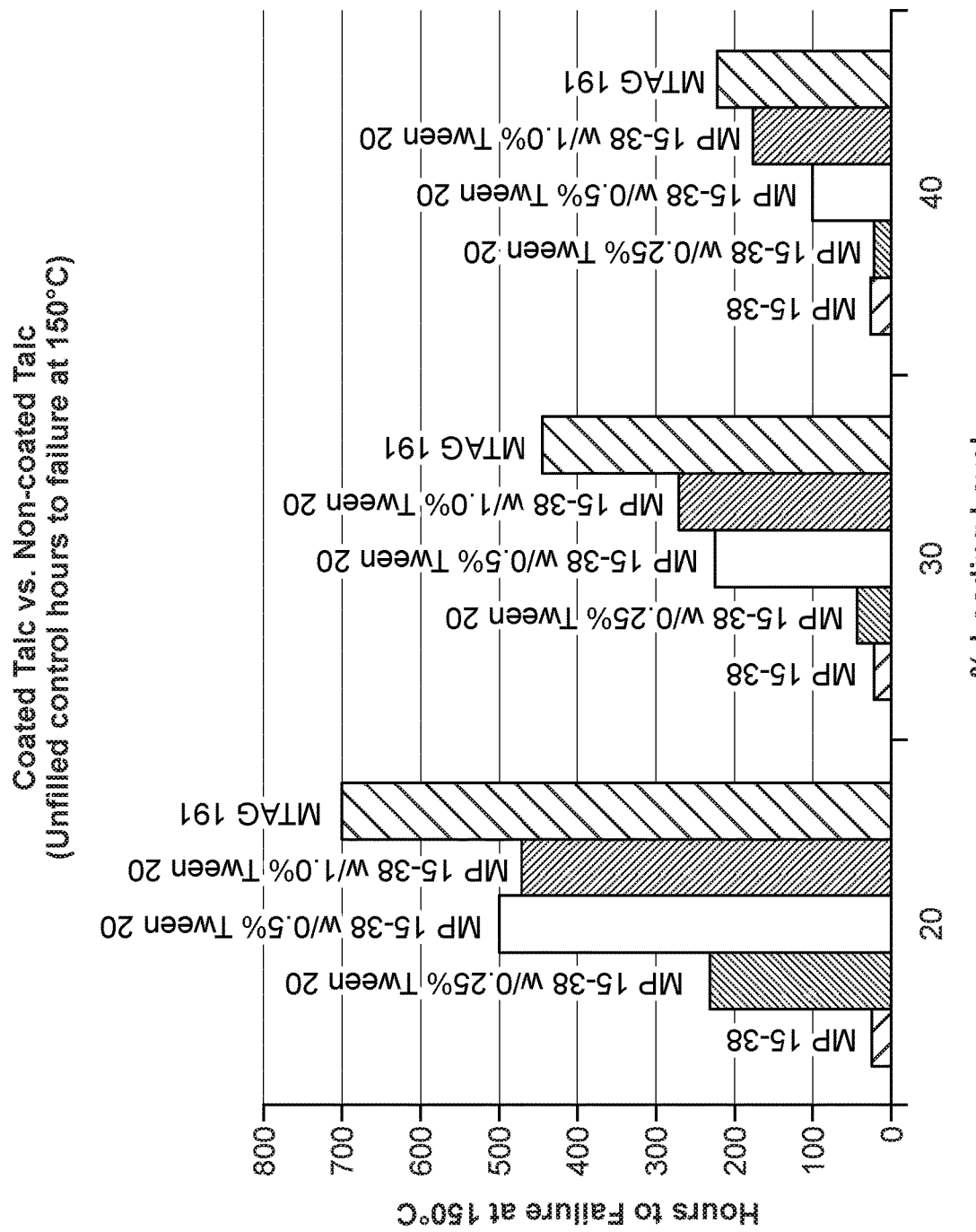
FIG. 1 depicts Long Term Heat Aging (LTHA) testing results for a polyolefin, an untreated talc and talc coated with polysorbate 20.

The dimensional stability and stiffness of polyolefins may be improved by including inorganic particles in the polyolefin polymer to form a composite polymer resin. Exemplary inorganic materials include, talc, calcium carbonate, precipitated calcium carbonate, clay or silica. Certain inorganic mineral particles have both polar and nonpolar or hydrophobic regions or sites. The polar regions or sites tend to preferentially adsorb polar species, such as polymeric hindered amines, phenolic based compounds, and thioethers that are typically used as thermal stabilizers.

Talc particles, for example, have a plate-like structure with nonpolar or hydrophobic surfaces and polar edges. Talc incorporated into a polymer adsorbs the thermal stabilizers added to the polyolefin preferentially to the polar edges of the talc particles. It is important for the thermal stabilizers to remain dispersed throughout the polyolefin polymer to provide thermal stability to the polymer when exposed to high temperatures. The adsorption of the thermal stabilizers by the talc present in the polyolefin for heat stability decreases the resistance of the polymer to thermal energy. Therefore, adsorption of the thermal stabilizers causes embrittlement of a composite composition at a much sooner time than if the talc were not added to the polymer. This has been a long term problem since the development of talc-reinforced polyolefin based plastics in elevated temperature environments.

The problem of adsorption of the thermal stabilizers may be addressed through use of more expensive engineered resins such as nylon or increasing the amount of expensive thermal stabilizers (such as polymeric hindered amines) to compensate for the amount adsorbed by the talc. However, these alternatives may not be a cost effective way of mitigating the problem of accelerated thermal degradation of talc-polyolefin composites for applications in elevated temperature environments.

The present invention includes a surface treatment that adsorbs strongly enough onto the talc to block the sites that adsorb the thermal stabilizers in the polyolefin polymer and is compatible with both the talc and the polyolefin matrix. The surface treatment thereby allows the thermal stabilizers to remain in the polymer matrix to extend the service life of the part subjected to elevated temperatures much longer than if the surface treatment was not added to the talc prior to melt compounding with the polyolefin. Melt compounding is a process of melt blending polymers with other additives. Development of such a surface treatment is challenging at least in part because a surface treatment must be identified that adsorbs strongly enough onto the polar edges of the talc mineral without desorbing during melt compounding and is still compatible with the polyolefin matrix.

Aspects of the present invention include a composition including a polyolefin; particles of inorganic mineral having a surface treatment including a coating of a surface treatment component, and thermal stabilizers. The inorganic mineral is selected from the group consisting of talc, calcium carbonate, precipitated calcium carbonate, clay, and silica. The surface treatment component may be selected from the group consisting of a functionalized polyether and a carbon based polymer. The surface treatment component inhibits adsorption of the thermal stabilizers on the particles which allows the thermal stabilizers to reduce degradation of the composition due to exposure to a high temperature environment.

In the above aspects, the coating partially or completely covers a surface of the particles. The coating thickness may be uniform over the surface of talc particles.

In the above aspect, the thermal stabilizers are distributed throughout the polymer, rather than preferentially adsorbed on the particle surface. It is believed that the surface treatment component blocks sites on the particles that can adsorb the thermal stabilizers in the polymer which would decrease a resistance of the polymer to thermal energy. As a result, the thermal stabilizers are able to improve heat resistance to heat exposure in a high temperature environment.

A ratio of the surface treatment component to the particle may 0.1 to 1 wt %.

The amount or loading of inorganic particles in the composition may be 0.1 to 1, 1 to 10 wt %, 10 to 20 wt %, 20 to 30 wt %, 30 to 40 wt %, or greater than 40 wt %.

A preferred surface treatment component is polyoxyethylene (20) sorbitan monolaurate or polysorbate 20 (PO-20). PO-20 is a nonionic surfactant with a nonpolar end and a polar end. The structure of PO-20 is:

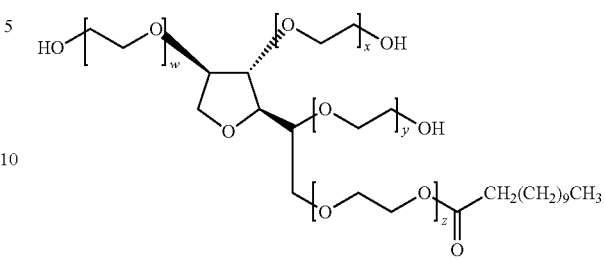

Common commercial forms of PO-20 include Tween™ 20 from Croda and TMAZ® 20 from BASF. A preferred inorganic mineral is talc. The preferred coating level range is 0.4 to 0.8 wt % PO-20/wt of talc.

The PO-20 acts as a compatibilizer between the talc particles and the polyolefin. As a result, it facilitates uniform dispersion of particles in the polyolefin. Additionally, the PO-20 adsorbs onto the polar edges of talc and blocks adsorption of thermal stabilizers.

The median particle size of the talc particles can be 0.1 to 10 microns, or more narrowly, 0.5 to 1 micron, 1 to 1.5 microns, 1.5 to 2 microns, 2 to 3 microns, 3 to 5 microns, or 5 to 10 microns.

The thermal stabilizers in the polyolefin are generally added by the resin manufacture at concentrations typically ranging from 0.05 to 1.0 wt %. These thermal stabilizers are most commonly selected from classes of sterically hindered amines, phenolic based compounds and thio-ethers added alone or in combination with one another. The thermal stabilizers may be 0.02 to 1.0 wt % of the composition, or more narrowly, 0.02 to 0.05 wt %, 0.05 to 0.07 wt %, or 0.07 to 1.0 wt % of the composition.

The present invention is a cost effective solution to using an alternative engineering resin versus the polyolefin and more cost effective than adding additional, more costly thermal stabilizers to compensate for the amount adsorbed by the talc. The present invention involves treating the source of the problem (the talc surface) rather than adding additional thermal stabilizers to compensate for adsorption onto the talc surface.

A high temperature application refers to one in which a part is exposed to high temperatures during use and throughout or part of its useful life. The high temperature exposure may correspond to repeated exposures where each high temperature exposure is followed by a decrease in temperature close to or at ambient temperature until the next high temperature exposure. Alternatively, the high temperature exposure may occur continuously throughout the useful life of a part.

The temperature of high temperature exposure depends on the particular application. The high temperature may be any temperature above ambient temperature. Ambient temperature may be 20-25° C. More narrowly, high temperature could refer to 40-50° C., 50-100° C., 100-120° C., or greater than 120° C.

High temperature applications include, without limitation, under the hood of a car, inside a car cabin, appliances (washing machines, dryers, ovens, refrigerators), and airplane engines. The high temperature exposure for under the hood applications is 100-120° C. and the period of exposure varies from exposure to exposure and can last from a few minutes to a few hours. The high temperature exposure for car cabin applications is 40-120° C. and the period of exposure varies from exposure to exposure and can last from a few minutes to a few hours. In general, the high temperature application is customer specified with a customer-specified high temperature range, time periods of exposure, and frequency of exposure.

The properties of a part used in a high temperature application tend to degrade over time during its useful life. In particular, heat exposure results in embrittlement of a polymer. "Embrittlement" refers to a loss of ductility of a material, making it brittle. Embrittlement makes a part susceptible to fracture and failure, making it no longer useful. Heat or high temperature exposure thus reduces the useful life of a part. The resistance of a part to high temperature exposure may be characterized by the time to embrittlement for when the part is exposed to a specified high temperature.

The testing of heat exposure is referred to as heat aging. Accelerated heat aging is typically employed. Accelerated aging is a procedure that seeks to determine the response of a part under normal-usage conditions over a relatively long time, by subjecting the product for a much shorter time to exaggerated conditions. The exaggerated conditions for heat aging correspond to an aging temperature higher than a temperature experienced during normal usage. An aging factor may be determined and employed to calculate the response (e.g., time to embrittlement) under normal-usage conditions from the response observed from the aging test. For example, a time to embrittlement of 200 hours may be observed at an aging temperature of 150° C. For a normal use temperature of 100-120° C., the time to embrittlement may correspond to about 400 hours.

The heat stability of parts is found by Long Term Heat Aging (LTHA) testing. A part is placed in a convection oven and exposed to a high temperature for a period of time. The properties of the part are monitored and the exposure time required to embrittle the part is identified.

An exemplary procedure is ASTM standard procedure number D-3045 for heat exposure guidelines for polypropylene. The equipment for the test is a Blue M Electric Convection Oven with Venting into Fume Hood. The oven is set to a designated aging temperature, such as 150° C., and a specimen is placed in the oven after a suitable warm-up time.

One objective of the aging test may be to make a determination of ranking to resistance to oxidation or other degradation when specimen is exposed to hot air for an extended period of time.

Another objective is determination of time to embrittlement, found from failure of the specimen. Assessing failure can be subjective so for consistency, failure may be defined as either (1) color change=observation of any oxidized areas with rust color or (2) brittle failure=visible cracks throughout specimen. A cooled specimen is held in a hand to inspect both sides of flex bar and gently flex the bar to inspect for brittleness/cracks.

Specimens may be checked periodically, such as twice daily until all fail. As specimens fail, they can be removed from the oven. The failure rate may be reported as the average of the failure times for the five specimens per sample reported as hours to failure.

Thermal stabilizers can be but are not limited to classes of hindered amine light stabilizers such as Chimassorb® 2020 and Uvinol® 4050 produced by BASF, phenolic and hindered phenols such as pentaerythrityl tetrakis-3-(3,5-di-tert-butyl-4-hydroxyphenyl) propionate and octacecyl 3-(3,5-di-tert-butyl-4-hydroxyphenyl) propionate or thioethers such as dilauryl thiodipropionate, distearyl thiodipropionate and dioctadecyl disulfide. These classes of thermal stabilizers can be used alone or in conjunction with each other to improve the thermal stability of polyolefin based polymer systems.

In some aspects, the surface treatment component includes polyethers and functionalized polyethers to reduce thermal stabilizer adsorption onto the talc. The general structural formula is:

where n is the number of repeating units (molecular weight), x is zero or an integer, R is an alkyl group, O is oxygen, C is carbon, H is hydrogen, and $R_1$ is a functional group which may be, without limitation, an alkyl carboxylate, an alkyl amine, an alkyl amide, an alkyl thiol, an alkyl sulfate, an alkyl sulfonate, an alkyl phosphate or an alkyl phosphonate and the like.

Polyethers and functionalized polyethers that are useful for the surface treatment of talc may be selected from the group consisting of poly(ethylene glycol), poly (ethylene glycol) Bis-(carboxymethyl) ether, poly (ethylene glycol) dimethyl ether, poly (ethylene glycol-400) distearate, and the like, and functionalized polyethers (alkyl carboxylate, alkyl amine, alkyl amide, alkyl sulfate, alkyl thiol, alkyl sulfonate, alkyl phosphate, alkyl phosphonate) wherein alkyl carboxylate functionality is preferred. There is no limitation on the method used to produce the polyethers and functionalized polyether polymers. Any combination of the above may be used. The polyethers and functionalized polyethers of the present invention may be manufactured by ionic polymerization or radical polymerization and the like, or by any other process known to produce polyethers and functionalized polyethers.

The molecular weight range of the polyethers and functionalized polyethers is from about 1000 to about 10,000,000 a.m.u., with a preferred range of from about 1,000 to about 1,000,000 a.m.u. The molecular weight can be determined by GPC. The molecular weight may refer to number average or weight average molecular weight.

A further aspect of the present invention pertains to the use of carbon based polymer coatings for surface treating the talc in order to lower the level of thermal stabilizer adsorption. Also included in the definition of carbon based polymers are maleic acid/olefin co-polymers.

Carbon based polymers that are useful for the surface treatment of talc may be selected from the group consisting of functionalized polyolefins: maleic acid/olefin copolymer, maleic acid/styrene copolymer, wherein maleic acid/styrene copolymer is preferred. Also included in the carbon-based polymers group are mineral oils of any boiling point and paraffin waxes of any melting point. The x/y ratio can range from about 100:1 to about 1:100, wherein the preferred range is from about 10:1 to about 1:10. C is carbon, O is oxygen, H is hydrogen and R is a functional group. R may be any group that can form a bond with carbon. This includes, without limitation, alkyl carboxylates, alkyl amines, alkyl amides, alkyl thiols, alkyl sulfates, alkyl sulfonates, alkyl phosphates, and alkyl phosphonates and the like.

The molecular weight of the carbon based polymer may range from about 100 to about 10,000,000 a.m.u., with a preferred range of from about 200 to about 2,000,000 a.m.u.

A further aspect the present invention pertains to the use of a surface treatment component of a functionalized polydialkyl, preferably polydimethylsiloxane, having the structural formula:

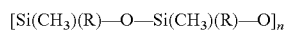

where n is the number of repeating units (molecular weight), CH$_3$ is a methyl group, Si is silicon, O is oxygen, and R is a functionalized alkyl group. The alkyl group may, without limitation, be functionalized with carboxylate, amine, amide, thiol, sulfate, phosphate, and the like.

Siloxane polymers that are useful in the present invention may be selected from the group consisting of functionalized alkyl polydimethylsiloxane (carboxylate, amine, amide, thiol, sulfate, phosphate) wherein carboxylate is preferred, Bis-(12-hydroxystearate) terminated polydimethylsiloxane (Aldrich Chemical Co.—1001 West Saint Paul Avenue, Milwaukee, Wis. 53233), and Poly(Dimethylsiloxane)-Graft-Polyacrylates (Aldrich). There is no limitation on the method used to produce the siloxane polymers. The siloxane polymers of the present invention may be manufactured by ionic polymerization or radical polymerization and the like, or any other process known to produce siloxane polymers.

The molecular weight range of the siloxane polymer is from about 1000 to about 1,000,000 atomic mass units (a.m.u.), preferably ranges from about 1000 to about 100,000 a.m.u. The molecular weight can be determined by gel permeation chromatography (GPC).

Silanes that are useful in the present invention have the structural formula SiR$_4$, where Si is silicon, R can be any group capable of forming a covalent bond with silicon (e.g., an alkyl group, an alkoxy group, a functionalized alkyl group, and a functionalized alkoxy group, and any combination thereof). The following silanes may be useful in the present invention: Octyltriethoxysilane (Momentive Silquest.® A-137 silane), Triamino functional silane (Momentive Silquest.® A-1130 silane), Bis-(gamma-trimethoxysilylpropyl) amine (Momentive Silquest.® A-1170 silane), all of which are commercially available from Momentive Performance Materials.

Any inorganic mineral, such as, talc, calcium carbonate, precipitated calcium carbonate, clay or silica, that is receptive to surface treatment may be coated with the polymers described herein. However, talc is the preferred inorganic mineral. Talcs that are particularly useful are those that are receptive to both surface treatment and that are capable of subsequent use in polyolefin film production. An exemplary, but non limiting talc, would typically have an empirical formula of Mg$_3$ Si$_4$ O$_{10}$ (OH)$_2$, and a specific gravity of from about 2.6 to about 2.9. The preferred talc, without other limitations, could have an average or median particle size of from about 0.1 microns to about 10 microns, wherein the preferred average or median particle size is from about 0.5 microns to about 7 microns. The talc may be coated with from about 0.01 weight percent to about 10 percent of the polymers described herein, wherein the preferred treatment level for coating is from about 0.25 weight percent to 2 weight percent, based on the weight of the polymer.

All of the polymer coatings described herein may be applied to talc by any convenient dry powder mixing operation. A method includes applying the polysorbate 20 surface treatment onto the talc, combining the talc and polysorbate streams at the desired rates to permit the target surface treatment to be attained, and adding mild to high shear agitation to thoroughly combine and distribute the coating over the surface of the talc.

The temperature at which the coating is applied to the talc, ranges from about 0° C. to about 500° C., preferably from about 30° C., to about 200° C., and more preferably, from about 60° C. to about 80° C. The application temperature should be adjusted to higher levels if the specific coating requires melting.

Once the talc is coated, a composition or composite of the talc and polyolefin may be formed. A melt processing method such as extrusion or melt compounding may be used to form a composite of the coated talc and polyolefin. Without limitations, the coated talc may be added to an extruder or added as an already compounded masterbatch to an extruder. A compounded masterbatch means the resin and the coated talc are pre-mixed in a compounder at a higher concentration and diluted to the target mineral concentration by melt compounding with a resin, for example, in an extruder.

A part may be formed from the mixture by passing the melt through a die or by using injection molding, thermoformed sheet, blow molding, or rotational molding as examples.

Polyolefins considered suitable for the present invention may be any polyolefin, which can be clear, crystalline. Non-limiting examples include crystalline homopolymers of α-olefin with carbon numbers ranging from 2 to 12 or a blend of two or more crystalline copolymers or ethylene-vinylacetate copolymers with other resins. Also, the polyolefin resin can be a high-density polyethylene, low density polyethylene, linear low-density polyethylene, polypropylene, ethylene-propylene copolymers, poly-1-butene, ethylene-vinyl acetate copolymers, etc., and low and medium-density polyethylenes. Additional examples are represented by random or block copolymers of polyethylene, polypropylene poly-r-methylpentene-1, and ethylene-propylene, and ethylene-propylene-hexene copolymers. Among them, copolymers of ethylene and propylene and those containing 1 or 2 selected from butene-1, hexene-1, 4-methylpentene-1, and octene-1 (the so-called LLDPE) are particularly suitable as well as metallocene catalyzed polymers.

The method of producing polyolefin resin used in the present invention is not limited. For example, it can be manufactured by ionic polymerization or radical polymerization. Examples of polyolefin resins obtained by ionic polymerization include homopolymers such as polyethylene, polypropylene, polybutene-2, and poly-4-methylpentene and ethylene copolymers obtained by copolymerizing ethylene and .alpha.-olefin, .alpha.-olefins having from 3 to 18 carbon atoms such as propylene, butene-1,4-methylpentene-1, hexene-1, octene-1, decene-1, and octadecene-1 are used as α-olefins. These α-olefins can be used individually or as two or more types. Other examples include propylene copolymers such as copolymers of propylene and butene-1. Examples of polyolefin resins obtained by radical polymerization include ethylene alone or ethylene copolymers obtained by copolymerizing ethylene and radical polymerizable monomers. Examples of radical polymerizable monomers include unsaturated carboxylic acids such as acrylic acid, methacrylic acid and maleic acid esters and acid anhydrides thereof, and vinyl esters such as vinyl acetate. Concrete examples of esters of unsaturated carboxylic acids include ethyl acrylate, methyl methacrylate and glycidyl methacrylate. These radical polymerizable monomers can be used individually or as two or more types.

Examples

Long term heat aging tests of polyolefin and talc compositions were performed.

In the first set of aging tests, compositions including talc coated with PO-20 (Tween 20) and compositions including uncoated talc were studied. The polyolefin was a polypropylene (PP) copolymer (cPP Flint 5325HS (20 melt index)) from Flint Hill Resources Polymers, LLC of Longview, Tex. Two talcs were used. The first talc was Talcron® MP 15-38 talc supplied by Specialty Minerals Incorporated. MP 15-38 has a median particle size of 2.0 microns. The second talc, Microtuff AG 191 (MTAG 191), also supplied by Specialty Minerals Incorporated has a median particle size of 1.8 microns. The coating used was PO-20. The following compositions were tested:

(1) non surface treated MP 15-38 talc in PP copolymer,
(2) MP 15-38 talc treated in the lab with PO-20 at a coating level of 0.25 wt % PO-20/wt % talc in PP copolymer,
(3) MP 15-38 talc treated in the lab with PO-20 at a coating level of 0.5 wt % PO-20/wt % talc in PP copolymer,
(4) MP 15-38 talc treated in the lab with PO-20 at a coating level of 1.0 wt % PO-20/wt % talc in PP copolymer,
(5) MTAG 191 talc treated in production facility with PO-20 at a coating level of 0.5-0.8% in PP copolymer.

Three different talc loading levels in PP copolymer were tested: 20 wt %, 30 wt %, and 40 wt %. Specimens were subjected to long term heat aging according to ASTM standard procedure number D-3045 described herein. The results of the LTHA showing hours to failure or embrittlement are shown in Table 1 and FIG. 1.

For the loading level of 20 wt % talc, a significant improvement in hours to failure was shown for all coated talc compositions (2)-(5), the best being (5). For the 30 wt % talc, the relative improvement is less significant for compositions (2), however, (5) still shows a dramatic improvement. For 40 wt %, composition (2) shows no improvement, while compositions (3)-(5) still show relative improvement. The smaller improvement in hours to fracture for smaller coating levels indicates a sensitivity to the minimum coating concentration.

TABLE 1

LHTA of PP copolymer and talc specimens with coated and uncoated talc.

| Sample ID | cPP Flint 5325 (%) | MINERAL Description | (%) | LTHA at 150° C. Hours to Failure |
|---|---|---|---|---|
| 1 | 100 | None | 0 | 835 |
| 2 | 80 | MP 15-38 | 20 | 24 |
| 3 | 70 | MP 15-38 | 30 | 24 |
| 4 | 60 | MP 15-38 | 40 | 28 |
| 5 | 80 | MP 15-38 w/0.25% Tween 20 | 20 | 232 |
| 6 | 70 | MP 15-38 w/0.25% Tween 20 | 30 | 46 |
| 7 | 60 | MP 15-38 w/0.25% Tween 20 | 40 | 24 |
| 8 | 80 | MP 15-38 w/0.50% Tween 20 | 20 | 500 |
| 9 | 70 | MP 15-38 w/0.50% Tween 20 | 30 | 224 |
| 10 | 60 | MP 15-38 w/0.50% Tween 20 | 40 | 101 |
| 11 | 80 | MP 15-38 w/1.0% Tween 20 | 20 | 473 |
| 12 | 70 | MP 15-38 w/1.0% Tween 20 | 30 | 270 |
| 13 | 60 | MP 15-38 w/1.0% Tween 20 | 40 | 176 |
| 14 | 80 | MTAG 191 | 20 | 701 |
| 15 | 70 | MTAG 191 | 30 | 442 |
| 16 | 60 | MTAG 191 | 40 | 227 |

In the second set of aging tests, compositions including talc coated with PO-20 polymer were studied. The polyolefin was a polypropylene copolymer (cPP). The following compositions were tested:

(6) Ultratalc 609, non-surface treated talc (median particle size of 0.8 micron), (7) Microtuff AG 609, surface treated with 0.8 wt % PO-20 in a production facility (median particle size 0.8 micron).

Both talcs are from Specialty Minerals Incorporated. Talc concentrations studied in the cPP were at 20 wt % and 40 wt %. The talc compositions were compared to the cPP polymer at 0 wt % talc concentration.

Figure 2:
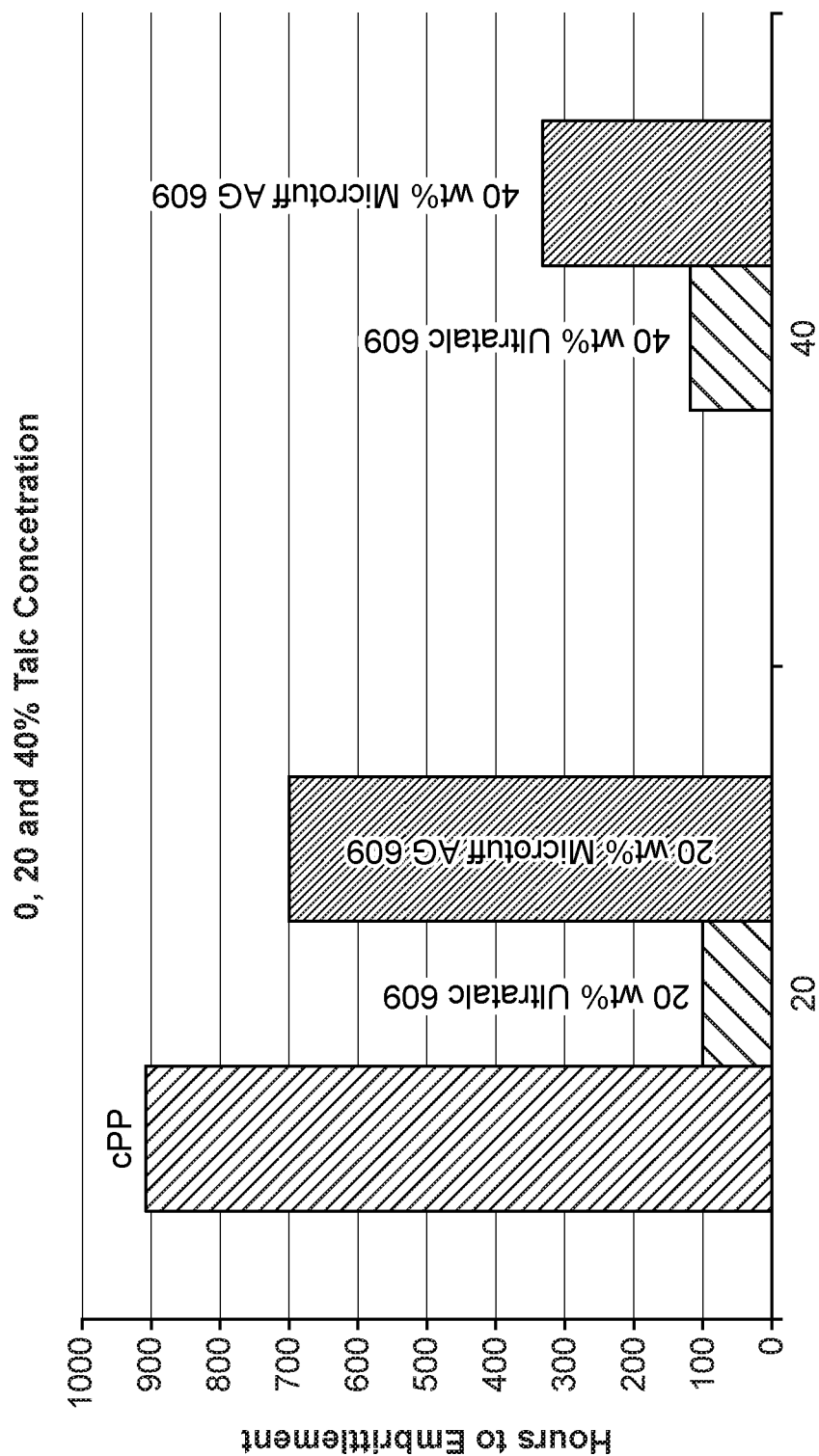
FIG. 2 depicts Long Term Heat Aging (LTHA) testing results for a polyolefin, an untreated talc and talc coated with polysorbate 20.

FIG. 2 depicts the results of the heat aging studies. At 20 wt % loading, the improvement in hours to embrittlement is significantly better for Microtuff AG 609 (the talc coated with 0.8% PO-20) compared to Ultratalc 609 containing no surface treatment. At 40 wt % loading, the Microtuff AG 609 is still superior, although the hours to embrittlement is reduced.

Figure 3:
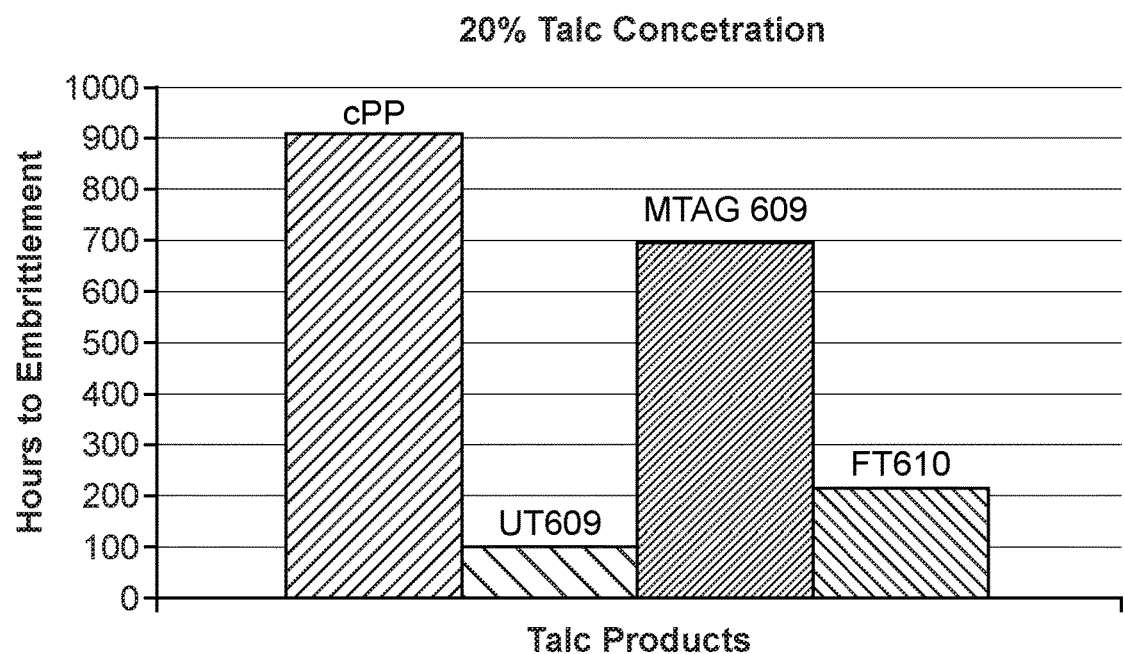
FIG. 3 depicts LTHA testing results for a polyolefin, an untreated talc and talc coated with polysorbate 20 at a talc concentration of 20 wt %.
Figure 4:
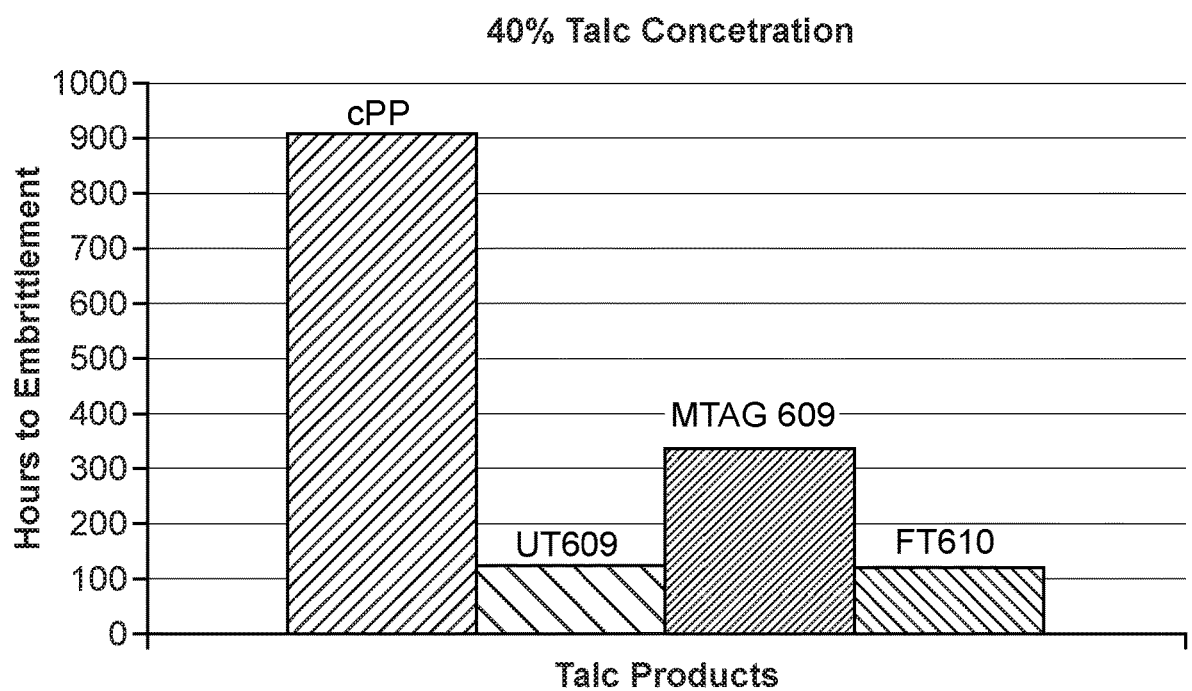
FIG. 4 depicts LTHA testing results for a polyolefin, an untreated talc and talc coated with polysorbate 20 at a talc concentration of 40 wt %.

In the third set of aging tests, compositions including polymer coated talc were studied. The polyolefin was a polypropylene (PP) copolymer (cPP Flint 5325HS (20 melt index)) from Flint Hill Resources Polymers, LLC of Longview, Tex.). Three talcs were studied, all from Specialty Minerals Incorporated:

(8) Ultratalc 609—median particle size of 0.8 micron, no surface treatment
(9) Microtuff AG-609 (MTAG 609)—median particle size of 0.8 micron containing 0.8 wt % PO-20 surface treatment,
(10) Flextalc 610—median particle size of 1 micron, no surface treatment, Two loading levels of talc were studied, 20 wt % and 40 wt %. The results of the LTHA are shown in FIGS. 3 and 4 for respective talc concentrations. For the 20 wt % loading, the surface treated MTAG 609 provided the best results. The FT610 and UT609 (non-surface treated talcs) samples provide significantly lower hours to embrittlement. Similar results in relative terms are shown for the loading level of 40 wt %.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

What is claimed is:

1. A composition comprising;
a polyolefin;
particles of inorganic mineral comprising a surface treatment component; and
a thermal stabilizer;
wherein the inorganic mineral comprises talc, calcium carbonate, precipitated calcium carbonate, clay, silica, or any combination of talc, calcium carbonate, precipitated calcium carbonate, clay, and silica, and
wherein the surface treatment component comprises a polysorbate.

2. The composition of claim 1, wherein the inorganic particles comprise a median particle size of 0.1 to 10 microns.

3. The composition of claim 1, wherein the inorganic mineral comprises talc.

4. The composition of claim 1, wherein the ratio of the weight percent of the surface treatment component in the composition to the weight percent of the inorganic mineral in the composition is 0.1 to 5.

5. The composition of claim 1, wherein the ratio of the weight percent of the surface treatment component in the composition to the weight percent of the inorganic mineral in the composition is 0.4 to 0.8.

6. The composition of claim 1, wherein the surface treatment component blocks sites on the particles that can adsorb the thermal stabilizer, and wherein the thermal stabilizer constitute 0.02 to 1.0 weight percentage of the composition.

* * * * *